United States Patent [19]

Shepard

[11] Patent Number: 5,266,768

[45] Date of Patent: Nov. 30, 1993

[54] COOLING SYSTEM FOR MULTI-TIP SPOT WELDER

[76] Inventor: Mark A. Shepard, P.O. Box 576, Doawagiac, Mich. 49047

[21] Appl. No.: 955,491

[22] Filed: Oct. 2, 1992

[51] Int. Cl.⁵ .............................................. B23K 11/31
[52] U.S. Cl. .................................. 219/120; 219/86.31
[58] Field of Search .................... 219/120, 86.31, 86.8, 219/86.9, 87

[56] References Cited

U.S. PATENT DOCUMENTS

| | | | |
|---|---|---|---|
| 2,097,377 | 10/1937 | Martin | 219/486.9 |
| 3,067,309 | 12/1962 | Chinn | 219/87 |
| 3,235,704 | 2/1966 | Rockwell | 219/119 |
| 3,270,181 | 8/1966 | Wendler | 219/86.9 |
| 3,558,847 | 1/1971 | Width | 219/87 |
| 3,558,848 | 1/1971 | Width | 219/87 |
| 3,692,970 | 9/1972 | Gott et al. | 219/56 |
| 4,229,637 | 10/1980 | Dederer et al. | 219/86.25 |
| 4,529,858 | 7/1985 | Scherr et al. | 219/56 |
| 4,788,407 | 11/1988 | Flater | 219/120 |
| 4,910,376 | 3/1990 | Riley et al. | 219/119 |
| 5,079,400 | 1/1992 | Firlotte et al. | 219/86.21 |
| 5,153,405 | 10/1992 | Umeda | 219/86.31 |

FOREIGN PATENT DOCUMENTS

| | | | |
|---|---|---|---|
| 2141177 | 2/1973 | Fed. Rep. of Germany | 219/120 |
| 60-250884 | 12/1985 | Japan | 219/120 |
| 61-135487 | 6/1986 | Japan | 219/87 |
| 61-135488 | 6/1986 | Japan | 219/87 |
| 61-135489 | 6/1986 | Japan | 219/87 |
| 1371825 | 2/1988 | U.S.S.R. | 219/86.31 |

Primary Examiner—Geoffrey S. Evans
Attorney, Agent, or Firm—Baker & Daniels

[57] ABSTRACT

A system and method for cooling multiple weld tips of a welder. The welding system includes a housing and a plurality of weld tip plungers, each plunger being independently movable with respect to the housing, and each plunger having a mechanism for receiving a weld tip, a first port and a second port. The system also includes a primary input manifold including a mechanism for receiving fluid and at least one outlet port and a primary output manifold including a mechanism for discharging fluid and at least one inlet port. A first hose or hoses for communicating fluid from the at least one outlet port of the primary input manifold to each of the first ports of the plungers and a second hose or hoses for communicating fluid from each of the second ports of the plungers and to the at least one inlet port of the primary output manifold also are included in the system such that a fluid passing between the first and second ports of each plunger may circulate through a weld tip connected to the plunger. Fluid is provided to the at least one outlet port of the primary input manifold such that fluid flows through the first hose(s), through the first port of each weld tip plunger, through each weld tip, through the second port of each weld tip plunger and through the second hose(s) to the at least one inlet port of the primary output manifold. The system and method allows each weld tip of a multi-tip welder to be cooled individually and does not utilize seals which may deteriorate and subsequently case damage to the weld tips.

15 Claims, 6 Drawing Sheets

COOLING SYSTEM FOR MULTI-TIP SPOT WELDER

FIELD OF THE INVENTION

This invention relates to spot welders having multiple weld tips, and, in particular, to a cooling system for cooling multiple weld tips housed within a single housing.

BACKGROUND OF THE INVENTION

Spot welders having multiple tips are useful in many applications. For example, a manifacturer may manufacture a part consisting of two pieces of metal which are to be welded in multiple locations to ensure that the pieces remain joined together. A spot welder having single tip must be moved into multiple positions and weld in each of those positions to join the parts together. However, a multiple tip spot welder need not be moved.

Multi-tip spot welders are usually comprised of a housing or holder which holds multiple weld tip plungers. Generally, the housing is able to move in a vertical direction to cause the weld tips connected to exert pressure on the workpice when welding. Furthermore, because sufficient pressure is required to result in a good weld, in many instances, each weld tip plunger is also able to move vertically, within the housing, and is biased toward the workpiece. For some spot welders, such as the EQUATIP Dual Tip Holder disclosed in U.S. Pat. No. 3,558,847, two weld tip plungers, each biased by a compression spring, are operatively connected such that although the plungers are able to move independent of the housing, they are not able to move independent of each other. Other welders, such as those disclosed in U.S. Pat. Nos. 2,097,377, 3,692,970 and 5,079,400, provide mechanisms whereby each weld tip is able to move in the vertical direction independent of each other and independent of the housing.

In some applications, the voltage required for the weld is such that the weld tip may become excessively hot and may even melt or become deformed. To compensate for the heat generated, a coolant is usually provided to the weld tips to extend their useful life. Traditionally, coolant is introduced to the housing and flows from within the housing to provide coolant to all weld tips by flowing around the biasing mechanism of the weld plunger to the weld tip. Because the weld tip plunger is able to move in a vertical direction, a seal must be provided to keep coolant from flowing outside of the weld tip plunger. For example, an O-ring is used around the weld tip plunger (between the weld tip plunger and housing) in the EQUATIP Dual Tip Holder. However, the requirement of such a seal introduces other problems. The seal may deteriorate resulting in the loss of coolant from what was intended to be a closed system. If coolant loss is sustained, damage to the weld tip results as the weld tip is not sufficiently cooled. Thus, it is desirable to provide a coolant system for a multi-tip spot welder which does not utilize a seal between moving metal parts which may potentially deteriorate and which may result in damage to the weld tip.

Provision of coolant to each weld tip plunger from an external source also presents the problem of connecting many hoses to the spot welder as two hoses, one for the delivery of coolant and one for the removal of heated coolant, are required for each weld tip. Thus, it is desirable to limit the number of hoses connected to the welder from an external coolant source and to limit the length of each hose so as to reduce the possibility of losing coolant either at the coolant hose's connection points or from a break in the hose.

In general, the weld tip is comprised of a hollow weld cap at the operative end of the weld tip through which the coolant flows. U.S. Pat. No. 4,788,407 discloses another type of weld tip for insertion into a weld tip plunger which includes valves within the body of the weld tip and a replaceable weld cap such that when the cap is removed the valves prevent the coolant from leaking from the weld tip. This patent does not, however, address the problem of providing coolant to multiple weld tips, any of which may be the weld tip disclosed in U.S. Pat. No. 4,788,407. It is desirable to provide a multi-tip spot welder which is able to utilize traditional hollow weld tips or weld tips having an integral valve system therein.

Objects of the Invention

Accordingly, it is one object of the present invention to provide a coolant system for a multi-tip spot welder which provides coolant to each individual weld tip to thereby enhance the coolant's effect on each weld tip.

It is another object of the present invention to provide a coolant system for a multi-tip spot welder which does not utilize seals which may deteriorate and subsequently cause damage to the weld tips.

It is yet another object of the present invention to provide a coolant system for a multi-tip spot welder which limits the number of hoses required from the external coolant source.

It is still another object of the present invention to provide a coolant system for a multi-tip spot welder which provides coolant for a variety of commercially available weld tips.

SUMMARY OF THE INVENTION

The invention comprises a system for welding having multiple weld tips and a method for cooling the weld tips of a welder wherein the weld tips are independently movable with respect to each other and the housing of the system. Specifically, the welding system comprises, in one embodiment thereof, a housing and a plurality of weld tips plungers. Each plunger has a means for receiving a weld tip and first and second ports. The system also includes a primary input manifold including a means for receiving fluid and at least one outlet port and a primary output manifold including a means for discharging fluid and at least one inlet port. A first hose means communicates fluid from the at least one outlet port of the primary input manifold to each of the first ports of the plungers and a second hose means communicates fluid from each of the second ports of the plungers to the at least one inlet port of the primary output manifold such that fluid introduced to the primary input manifold passes between the first and second ports of each plunger and may circulate through a weld tip connected to the plunger.

Various embodiments of the welding system are presented herein. The system supports numerous weld tips and various configurations for communication between the primary input manifold and the weld tip plungers and for communication between the weld tip plungers and the primary output manifold are envisioned. The welding system of the present invention provides a cooling system which provides coolant individually to each weld tip plunger and weld tip connected thereto to enhance the coolant's effect on each weld tip. This is accomplished without requiring numerous hoses be connected to the system from an external coolant source. Also, no seals, which may deteriorate and subsequently cause damage to the weld tips, are utilized in the present invention.

The method for cooling the weld tips of a welder wherein the weld tips are independently movable with respect to the housing according to the present invention utilizes the system for welding further comprising weld tips, each weld tip connected to one of the weld tip plungers. Fluid is provided to the at least one outlet port of the primary input manifold such that fluid flow through the first hose means, through the first port of each weld tip plunger, through each weld tip, through the second port of each weld tip plunger and through the second hose means to the at least one inlet port of the primary output manifold. In this manner, each weld tip is cooled from a single source of coolant, namely the primary input manifold, and the warmed fluid leaving the weld tips is provided to the primary output manifold.

DETAILED DESCRIPTION

Figure 1:
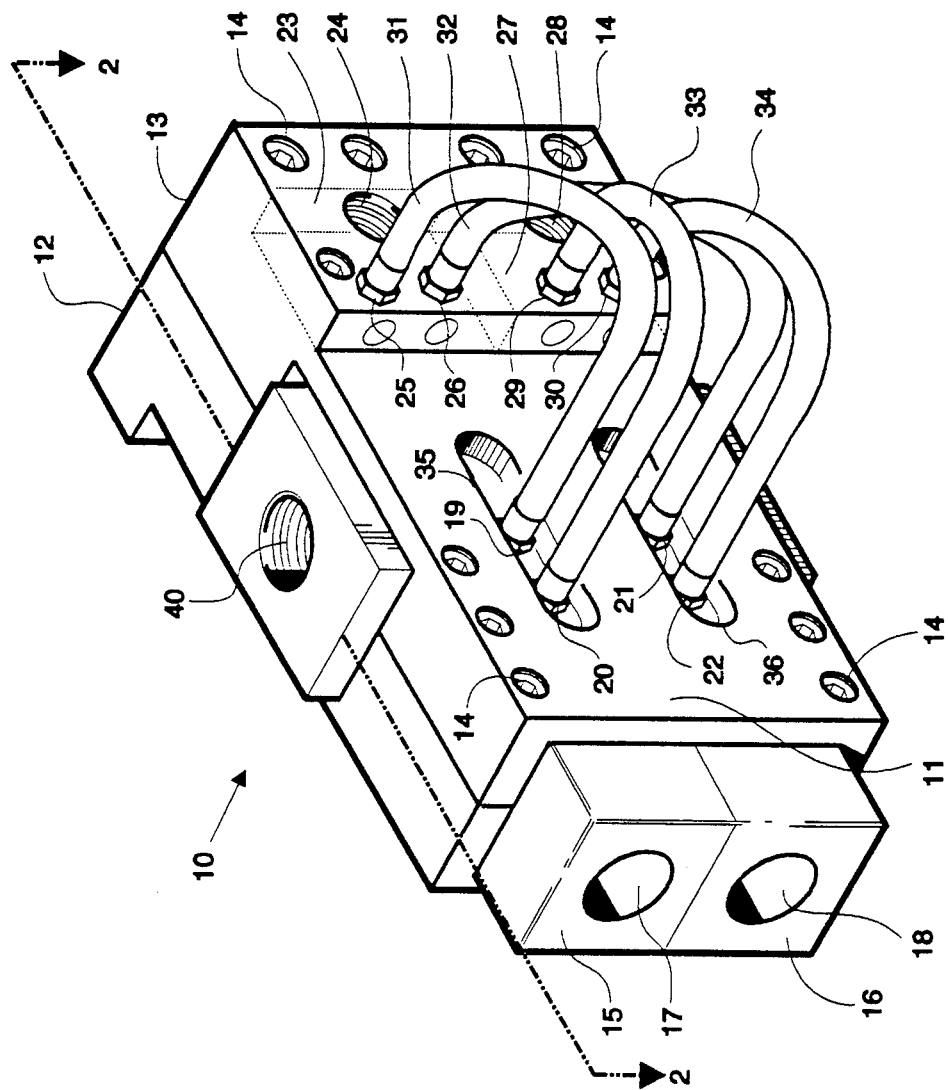
FIG. 1 shows a perspective view of one embodiment of a multi-tip spot welder of the present invention having an integral cooling system.

Referring now to FIG. 1, there is shown a perspective view of one embodiment of a multi-tip spot welder of the present invention having an integral cooling system. Welding system 10 comprises housing 11 which, in this embodiment, is made of silicone bronze and includes first housing section 12 connected to second housing section 13 via fasteners 14 therebetween. Within housing 11 are first and second weld tip plungers 15 and 16, respectively. First weld tip plunger 15 includes first means 17 for receiving a weld tip and second weld tip plunger 16 includes second means 18 for receiving a weld tip to permit weld tips to be connected to first and second weld tip receiving means 17 and 18 as is illustrated, for example, in the embodiment of FIG. 3. To provide fluid or coolant to a weld tip connected to first weld tip receiving means 17 of first weld tip plunger 15 and to release fluid from first weld tip plunger 15, weld tip plunger 15 includes first port 19 and second port 20. Similarly, second weld tip plunger 16 includes first port 21 and second port 22. Welding system 10 also includes primary input manifold 23 which includes means 24 for receiving fluid and outlet ports 25 and 26. Primary output manifold 27 includes means for discharging fluid 28 and inlet ports 29 and 30. Fluid provided to fluid receiving means 24 of primary input manifold 23 flows to outlet ports 25 and 26. In this embodiment, primary input and output manifolds 24 and 27 are connected to housing 11 and are essentially integral with housing 11 thereby providing a compact welding system. First hose 31 is connected to outlet port 25 and first port 19 of first weld tip plunger 15 and second hose 32 is connected to outlet port 26 of primary input manifold 23 to first port 21 of second weld tip plunger 16 so that fluid provided to outlet ports 25 and 26 flows through first and second hoses 31 and 32 to first port 19 of first weld tip plunger 15 and to first port 21 of second weld tips plunger 17, respectively. Similarly, fluid from first and second weld tip plungers 15 and 16 via second ports 20 and 22, respectively, flow through third and fourth hoses 33 and 34, respectively, to inlet ports 29 and 30, respectively, of primary output manifold 27. Fluid entering primary output manifold 27 through inlet ports 29, 30 may be discharged through fluid discharging means 28.

To permit the first and second weld tip plungers 15 and 16 to move independently of each other within housing 11 while providing fluid to first and second weld tip plungers 15 and 16, housing 11 also includes first and second slots 35 and 36 which expose first and second ports 19 and 20 of first weld tip plunger 15 and first and second ports 21 and 22 of second weld tip plunger 16. In this embodiment, weld tip plungers 15 and 16 are similar to the embodiment illustrated in FIG. 2. To further accommodate the ability of first and second weld tip plungers 15 and 16 to move independently within housing 11, first, second, third and fourth hoses 31–34 are, in this embodiment, comprised of a flexible material such as plastic or synthetic rubber.

The method of cooling weld tips of the welding system of the present invention includes the step of providing fluid to fluid receiving means 24 of primary input manifold 23. In turn, fluid is provided to outlet ports 25 and 26 of primary input manifold 23. Fluid flows from outlet ports 25 and 26 through first and second hoses 31 and 32, through first ports 19 and 21 of first and second weld tip plungers 15 and 16, respectively, through weld tips connected to first and second weld tip plungers 15 and 16, through second ports 20 and 22 of first and second weld tip plungers 15 and 16, respectively, and through third and fourth hoses 33 and 34 to inlet ports 29 and 30 of primary output manifold 27. Thereafter, fluid may be discharged from fluid discharging means 28 of primary output manifold 27.

It will be appreciated by those of skill in the art that the present invention provides a system and method for providing fluid or coolant to each of the weld tips of a multi-tip welding system wherein the weld tips are independently movable within the housing. Specifically, each weld tip is individually cooled while limiting the number of hoses required to provide and release coolant from an external coolant source. Fluid is provided to the system at fluid receiving means 24 of primary input manifold 24 and discharged from the system at fluid discharging means 28 of primary output manifold 24. In this manner, only two external connections are required to the system to provide coolant to each weld tip individually—one connection from an external coolant source and one connection to a repository for fluid which has flowed through the weld tips—as primary manifold 24 and primary output manifold 27 provide centralized mechanisms for the provision of fluid to the weld tip plungers and the release of fluid from the weld tip plungers.

Figure 2:
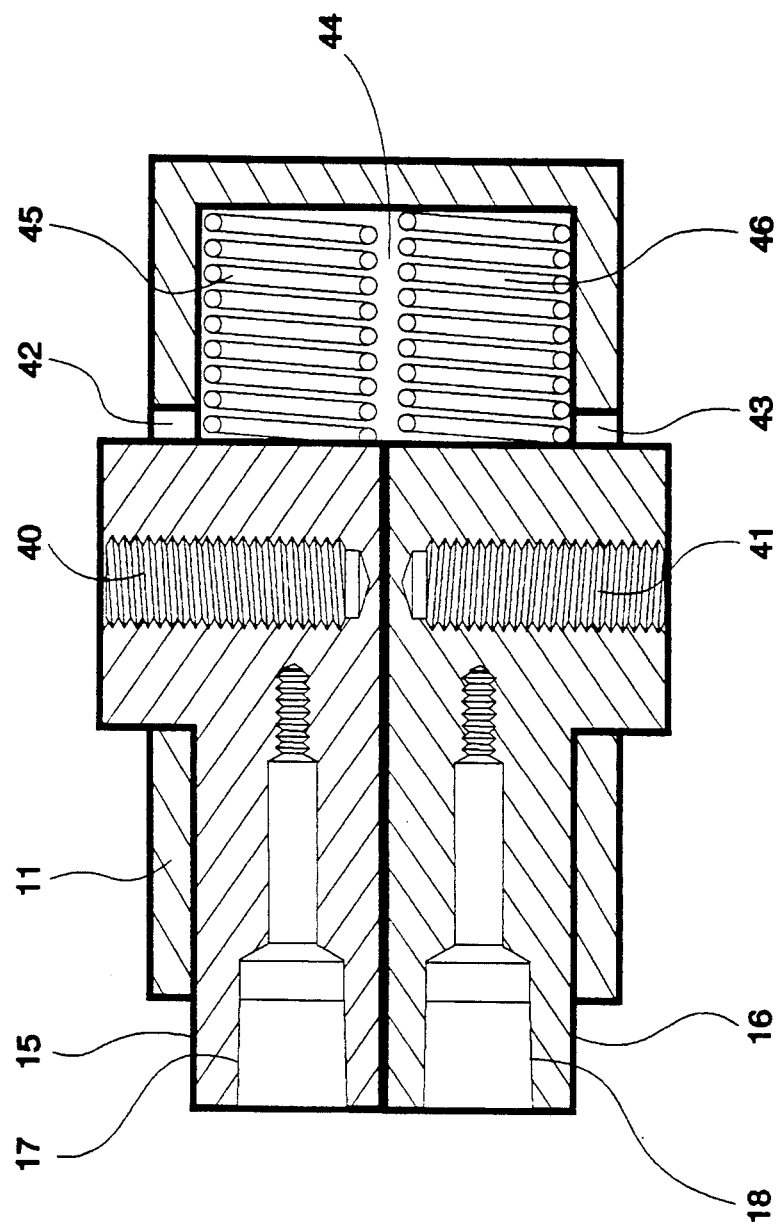
FIG. 2 shows a partial cross-sectional view of the embodiment of the spot welder according to FIG. 1 at line 2—2.

FIG. 2 shows a partial cross-sectional view of the embodiment of the spot welder according to FIG. 1 at line 2—2. In this embodiment, first and second weld tip plungers 15 and 16, respectively, are substantially L-shaped. First and second weld tip receiving means 17 and 18 are tapered at approximately 3° such that a weld tip may be inserted via a tapered fit into weld tip receiving means 17 and 18. First and second weld tip plungers 15 and 16 also comprise first and second means 40 and 41, respectively, for receiving electrical current and L-shaped weld tip plungers 15 and 16 are made of conductive material, such as a Class II hard copper, such that electrical current provided to first and second electrical current receiving means 40 and 41 is conducted to first and second weld tip receiving means 17 and 18, respectively. In this embodiment, first and second electrical current receiving means 40 and 41 each comprise a threaded cavity into which a threaded electrical connector may be inserted. Other types of electrical connections are feasible and not precluded by the presentation of the embodiment illustrated in FIG. 2. However, as in this embodiment, it is desirable to provide current to the weld tip through immobile components thereby avoiding the potential problems of arcing and sparking incurred when current flows through conductors which are moving with respect to each other.

To permit first and second weld tip plungers 15 and 16 to move independently with respect to housing 11, housing 11 further comprises first and second apertures 42 and 43, respectively, through which a portion of first and second weld tip plungers 15 and 16 extend. First aperture 42 is larger than that portion of first weld tip plunger 15 which extends therethrough and second aperture 43 is larger than that portion of second plunger 16 which extends through second aperture 43. Disposed between first weld tip plunger 15 and housing 11 in cavity 44 of housing 11 is first bias means 45 which biases first weld tip plunger 15 away from housing 11. Similarly, second weld tip plunger 16 is biased away from housing 11 via second bias means 46 disposed within housing cavity 44. In this embodiment, first and second bias means 45 and 46 comprise compression springs. The provision of separate bias means 45 and 46 for first and second plungers 15 and 16, respectively, together with the provision of first and second apertures 42 and 43, respectively, allows first and second plungers 15 and 16 to move independent of each other with respect to the housing. A lubricant, such as an anti-seize lubricant, may be placed on all surfaces of first and second plungers 15 and 16 located within housing 11 to prevent plungers 15 and 16 from binding in the housing. Furthermore, as illustrated in FIG. 1, first slot 35 provides access through housing 11 to first and second ports 19 and 20 of first weld tip plunger 15 and second slot 36 provides access through housing 11 to first and second ports 21 and 22 of second weld tip plunger 16 such that ports 19-22 are not covered by housing 11 when first and second plungers 15 and 16 move with respect to each other and with respect to housing 11.

It will be appreciated by those of skill in the art that first and second apertures 42 and 43 serve as a stop means for first and second plungers 15 and 16 within housing 11. Specifically, once that portion of a plunger extending through an aperture in the housing abuts the edge of the aperture which is furthest away from the weld tip receiving means of the plunger, the plunger is not permitted to move any further in the direction toward the housing. In many applications, the housing itself may be biased. In this manner, proper pressure may be placed on the weld tips connected to the plungers to result in a good weld even if the weld tips engage an irregular workpiece surface.

Figure 3:
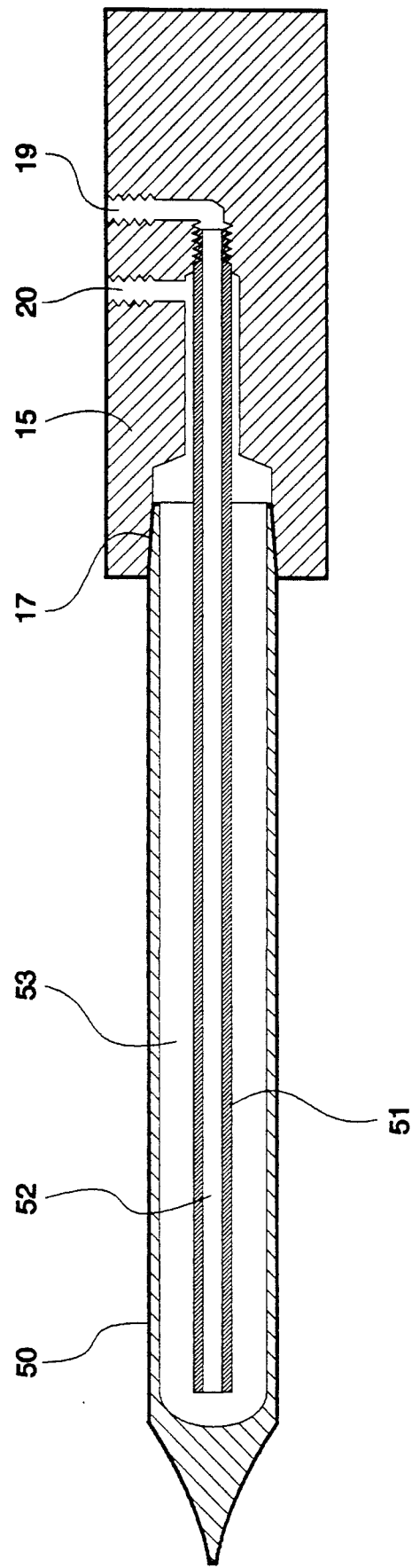
FIG. 3 shows a cross-sectional view of one embodiment of the weld tip plunger of the present invention.

Referring now to FIG. 3, there is shown a cross-sectional view of one embodiment of the weld tip plunger of the present invention. Weld tip plunger 15 is shown as having weld tip 50 engaged with weld tip receiving means 17. In this embodiment, weld tip receiving means 17 has a taper of approximately 3° degrees to allow weld tip 50 to be taper fit into weld tip receiving means 17. To separate fluid flowing from first port 19 to second port 20 of first weld tip plunger 15, weld tip plunger 15 includes tube 51 in communication with first port 19 of first weld tip plunger 15 and extending through first weld tip receiving means 17. In this embodiment, tube 51 is made of copper and threadably engages cavity 52 within first weld tip plunger 15. In general, tube 51 serves as a means for separating fluid within first weld tip plunger 15 from flowing directly between first port 19 and second port 20. Other embodiments are possible, such as the provision of two separate channels extending from first port 19 and second port 20, and are considered to be consistent with the present invention.

During operation, when fluid is provided to first weld tip plunger 15 via first port 19, the fluid flows through channel 52 of tube 51 into cavity 53 within weld tip 50. Fluid then flows to second port 20. In this manner, weld tip 50 is cooled.

It will be appreciated by those of skill in the art that various configurations may be utilized in accordance with the present invention to support weld tips of various types. For example, a weld tip may be of the type to threadably engage a weld tip plunger and may comprise a channel therein for the receipt of fluid flow. To utilize such a weld tip, weld tip receiving means 17 may be threaded. Should the channel within the weld tip have two ends, one for the entry of fluid and one for the release of fluid, the means for separating fluid within the plunger from flowing directly between first port 19 and second port 20 may comprise two channels within weld tip plunger 15 which engage the ends of the channel within the weld tip rather than tube 51 employed in this embodiment.

It will be appreciated by those of skill in the art that no seals between moving metal components are utilized in the welding system according to the present invention. The absence of seals eliminates problems associated with the deterioration and subsequent damage of the seals, causing coolant to leak.

Figure 4:
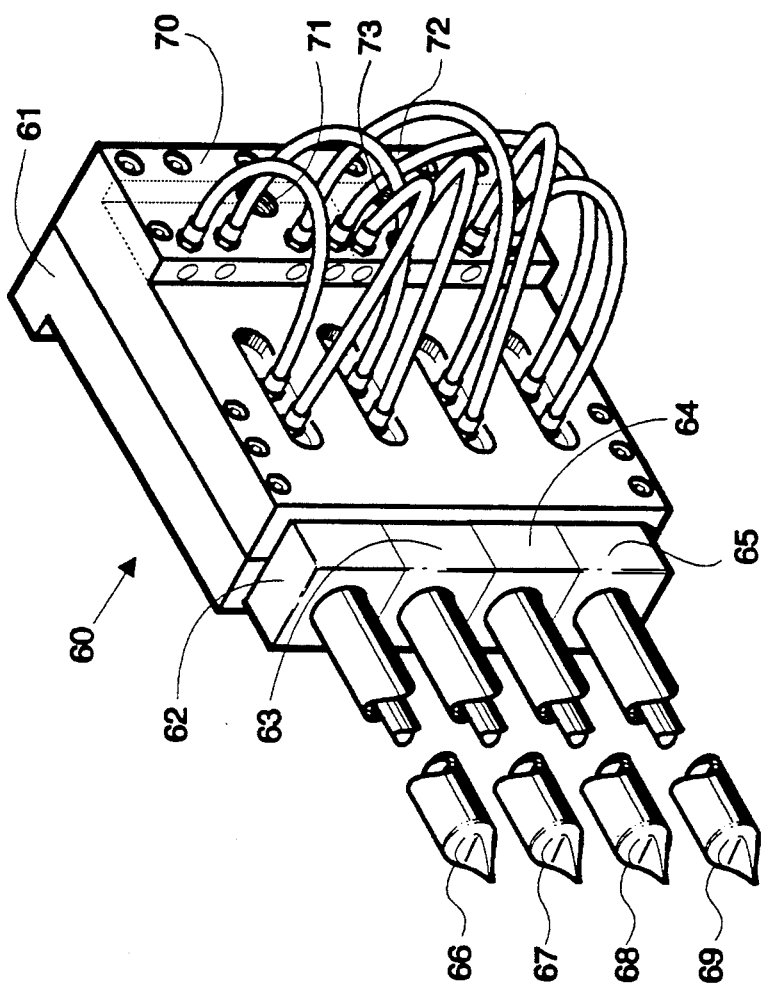
FIG. 4 shows a perspective view of a second embodiment of the spot welder according to the present invention wherein the spot welder holds four weld tips.

FIG. 4 shows a perspective view of the second embodiment of the spot welder according to the present invention when the spot welder holds four weld tips. In this embodiment, welding system 60 comprises housing 61 and four weld tip plungers 62–65 to which weld tips 66–69, respectively, are connected. In this embodiment, should weld tip plungers 62–65 be of type of the embodiment illustrated in FIGS. 2–3, electrical connection may be made on the reverse side (not shown) of housing 61. Welding system 60 further comprises primary input manifold 70 having means 71 for receiving fluid and primary output manifold 72 having means 73 for discharging fluid. Fluid is provided from primary input manifold 70 to weld tips 66–67 and to primary output manifold 72 in the same manner as is illustrated in FIG. 1.

It will be appreciated by those of skill in the art that the welding system of the present invention provides a general design which may be utilized to accommodate any number of weld tips. It is still only necessary to provide a single connection to an external fluid source to result in individually cooling each weld tip of the system. Also, only one connection is required to release fluid from all the weld tips of the system.

Figure 5A:
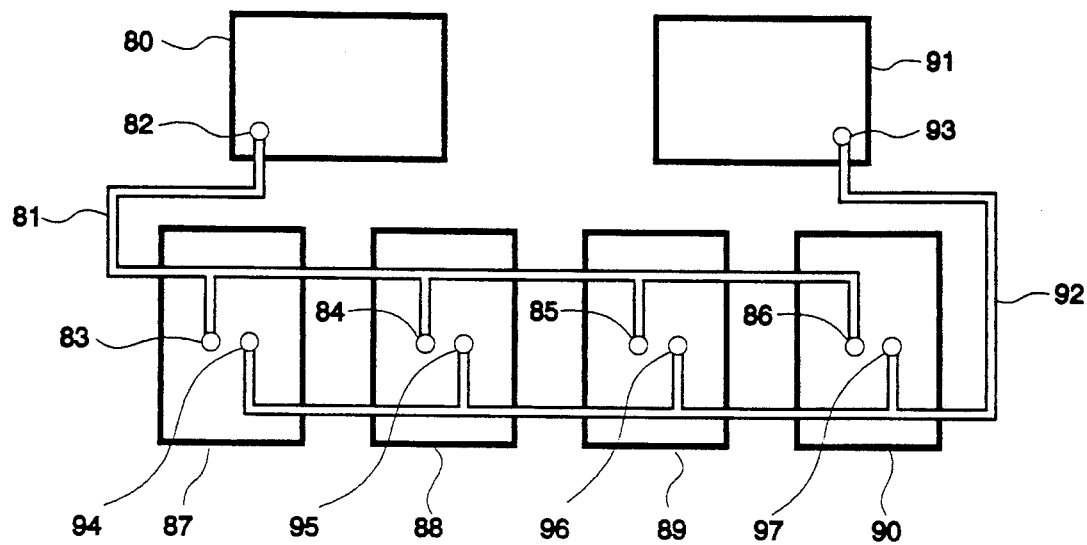
FIG. 5A shows a block diagram of one embodiment of the cooling system of the present invention in which the ports of the weld tip plungers are in parallel communication with both primary input manifold and the primary output manifold.
Figure 5B:
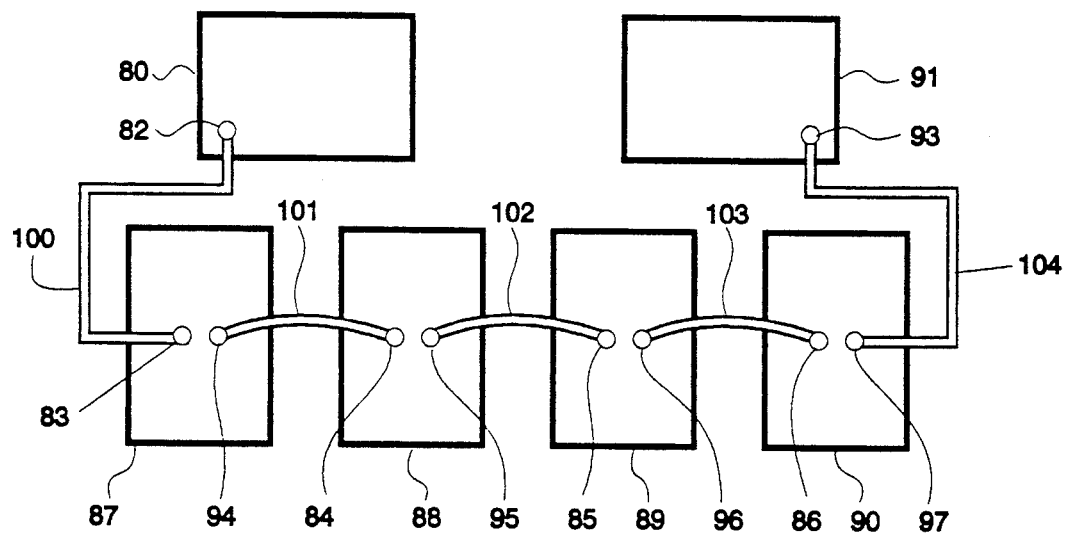
FIG. 5B shows a block diagram of another embodiment of the cooling system of the present invention in which the ports of the weld tip plungers are in serial communication with both the primary input manifold and the primary output manifold.
Figure 5C:
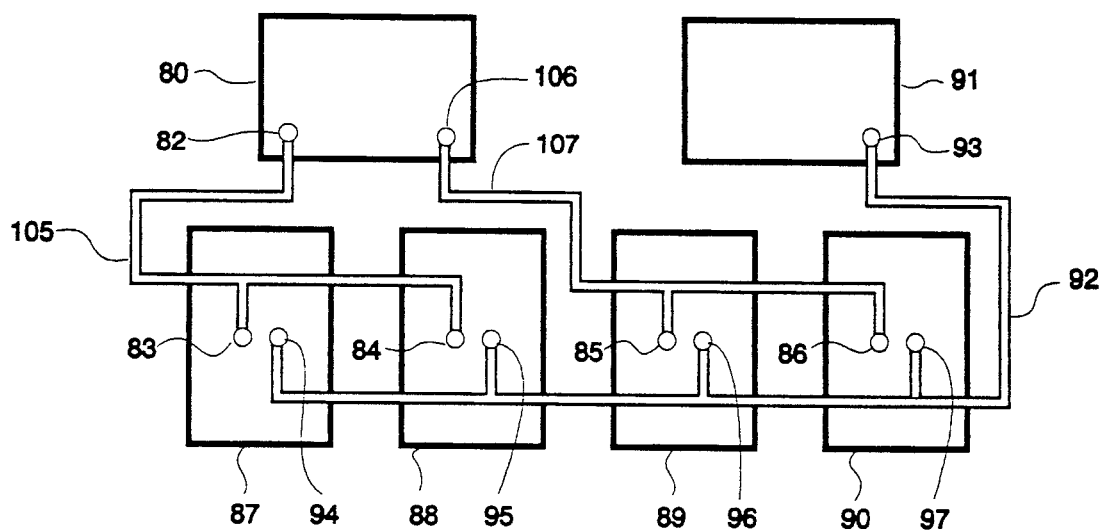
FIG. 5C shows a block diagram of another embodiment of the cooling system of the present invention in which the ports of the weld tips plungers are in both parallel and serial communication with the primary input manifold and in parallel communication with the primary output manifold.

Referring to FIGS. 5A–5C, there are shown block diagrams of three embodiments of the cooling system of the present invention in which the ports of the weld tip plungers are in various configurations of communication with the primary input manifold and the primary output manifold. In the embodiment of FIG. 5A, primary input manifold 80 is connected to first hose means 81 at outlet port 82. First hose means 81 is also connected to first ports 83, 84, 85 and 86 of first, second, third and fourth weld tip plungers 87, 88, 89 and 90, respectively. Thus, in this embodiment, first hose means 81 provides a parallel means for communicating fluid from outlet port 82 to first ports 83–86 of plungers 87–90. To release fluid from plungers 87–90, primary output manifold 91 is connected to second hose means 92 at inlet port 93. Second hose means 92 is also connected to second ports 94, 95, 96 and 97 of first, second, third and fourth weld tip plungers 87, 88, 89 and 90, respectively, to provide a parallel means for communication fluid from second ports 94–97 of plungers 87–90 to inlet port 93 of primary output manifold 91. Thus, first ports 83–87 and second ports 94–97 are in parallel communication with primary input and output manifolds 80 and 91.

FIG. 5B shows a block diagram of another embodiment of the cooling system in which first ports 83–87 and second ports 94–97 of weld tip plungers 87–90 are in serial communication with both primary input manifold 80 and primary output manifold 91. In this embodiment, first hose 100 connects outlet port 82 of primary manifold to first port 83 of first plunger 87; second hose 101 connects second port 94 of first plunger 87 to first port 84 of second plunger 88; third hose 102 connects second port 95 of second plunger 88 to first port 85 of third plunger 89; fourth hose 103 connects second port 96 of third plunger 89 to first port 86 of fourth plunger 90; and fifth hose 104 connects second port 97 of fourth plunger 90 to inlet port 93 of primary output manifold 91. In this manner, fluid provided to outlet port 92 of primary input manifold 80 flows through all weld plungers 87–90 before reaching inlet port 93 of primary output manifold 91.

FIG. 5C shows another embodiment in which primary output manifold 80 communicates with parallel hose means to second ports 94–97 of first to fourth weld tip plungers 87–90. Primary input manifold 80 communicates via parallel communication to first ports 83 and 84 of first and second weld tip plungers 87 and 88, respectively, and also communicates in parallel with first ports 85 and 86 of third and fourth weld tip plungers 89 and 90, respectively. Specifically, first hose 105 is connected to first outlet port 82 of primary input manifold 80 and to first ports 83 and 84 of first and second plungers 87 and 88, respectively. Second hose 107 is connected to second outlet port 106 and to first ports 85 and 96 of third and fourth plungers 89 and 90, respectively. As was illustrated in the embodiment of FIG. 5A, second hose means 92 is connected to inlet port 93 of primary output manifold 91 and to second ports 94–97 of plungers 87–90.

It will be appreciated by those of skill in the art that fluid communication with any number of weld tip plungers may be accomplished by various combinations of hose means between the primary input manifold and the primary output manifold to the first and second ports of any number of weld tip plungers. When parallel communication is provided from primary input manifold 80 to all weld tip plungers within the system as illustrated in FIG. 5A, each individual weld tip plunger is provided with coolant of the temperature equivalent to that within primary input manifold 80. When in serial communication as illustrated in FIG. 5B, fluid flowing through first weld tip plunger may be warmed before reaching the second weld tip plunger, and also the third and fourth weld tip plungers. For some applications, it may be preferable to cool each weld tip individually according to the embodiment of FIG. 5A. However, a parallel communication configuration is not absolutely necessary and may depend on the coolant requirements for the weld tips. For example, the embodiment of FIG. 5C provides coolant of the temperature from primary input manifold 80 to pairs of weld tip plungers. This may have an intermediate effect between the embodiments illustrated in FIG. 5A in which coolant is provided individually to each weld tip plunger and the embodiment of FIG. 5B in which coolant is provided collectively to all weld tip plungers within the system.

It will be further appreciated that the number of outlet ports present in primary input manifold 80 and the number of inlet ports present in primary output manifold 91 are dependent on the specific configuration desired. As already discussed, this configuration depends on the degree of cooling required for the particular application in which the welding system is utilized. Furthermore, as used in the claims, the term "first hose means" refers to any number of hoses required to supply fluid from the primary input manifold to the first ports of each and every weld tip plunger in the system. The term "second hose means" refers to any number of hoses requires to allow fluid to flow from the second port of each and every weld tip plunger in the system to the primary output manifold.

What is claimed is:

1. A system for welding having multiple weld tips, comprising:
   a housing;
   a plurality of weld tip plungers, each plunger being independently movable with respect to the housing and with respect to each other, and each plunger having
      means for receiving a weld tip, and
      a first and a second port;
   a primary input manifold including means for receiving fluid and at least one outlet port;

a primary output manifold including means for discharging fluid and at least one inlet port;
a first hose means for communicating fluid from the at least one outlet port of the primary input manifold to each of the first ports of the plungers; and
a second hose means for communicating fluid from each of the second ports of the plungers and to the at least one inlet port of the primary output manifold,
whereby fluid passing between the first and second ports of each plunger may circulate through a weld tip connected to the plunger.

2. The system of claim 1 further comprising:
a plurality of weld tips, each weld tip connected to one of the weld tip receiving means.

3. The system of claim 1 wherein each weld tip plunger further comprises a means for separating fluid within the plunger from flowing directly between the first and second port.

4. The system of claim 1 further comprising a tube in each plunger, each tube in communication with either the first port or the second port of the plunger and extending through the weld tip receiving means.

5. The system of claim 1 wherein each weld tip plunger is made of conductive material and further comprises means for receiving electrical current such that electrical current provided to the current receiving means is conducted to the weld tip receiving means.

6. The system of claim 1 wherein the first hose means is flexible.

7. The system of claim 1 wherein the second hose means is flexible.

8. The system of claim 1 wherein the first and second ports of each plunger are in parallel communication with the primary input and primary output manifolds.

9. The system of claim 1 wherein the first and second ports of each plunger are in serial communication with the primary input and primary output manifolds.

10. The system of claim 1 wherein the primary input and primary output manifolds are connected to the housing.

11. The system of claim 1 wherein the primary input manifold comprises one outlet port for each plunger.

12. The system of claim 1 wherein the primary output manifold comprises one inlet port for each plunger.

13. A method of cooling the weld tips of a welder, comprising the steps of:
providing a welder having
a housing,
a plurality of weld tip plungers, each plunger being independently movable with respect to the housing and with respect to each other, and each plunger having
means for receiving a weld tip, and
first and second ports,
a primary input manifold including means for receiving fluid and at least one outlet port,
a primary output manifold including means for discharging fluid and at least one inlet port,
a first hose means for communicating fluid from the at least one outlet port of the primary input manifold to each of the first ports of the plungers,
a second hose means for communicating fluid from each of the second ports of the plungers and to the at least one inlet port of the primary output manifold, and
a plurality of weld tips, each weld tip connected to one of the weld tip receiving means; and
providing fluid to the at least one outlet port of the primary input manifold such that fluid flows through the first hose means, through the first port of each weld tip plunger, through each weld tip, through the second port of each weld tip plunger and through the second hose means to the at least one inlet port of the primary output manifold.

14. The method of claim 13 further comprising, prior to providing fluid to the at least one outlet port of the primary input manifold, the step of:
providing fluid to the fluid receiving means of the primary input manifold.

15. The method of claim 13 further comprising the step of:
discharging fluid from the fluid discharging means of the primary output manifold.

* * * * *